US006986265B2

(12) United States Patent
Johansen

(10) Patent No.: US 6,986,265 B2
(45) Date of Patent: Jan. 17, 2006

(54) PELLET PRESS FOR DRY ICE

(75) Inventor: Steen Johansen, Middelfart (DK)

(73) Assignee: Cold Blasting APS, Odense (DK)

(*) Notice: Subject to any disclaimer, the term of this patent is extended or adjusted under 35 U.S.C. 154(b) by 0 days.

(21) Appl. No.: 10/363,762

(22) PCT Filed: Mar. 14, 2002

(86) PCT No.: PCT/DK01/00535

§ 371 (c)(1), (2), (4) Date: Aug. 4, 2003

(87) PCT Pub. No.: WO02/21059

PCT Pub. Date: Mar. 14, 2002

(65) Prior Publication Data

US 2004/0035146 A1 Feb. 26, 2004

(51) Int. Cl.
*F25J 1/00* (2006.01)

(52) U.S. Cl. .......................................... 62/604; 62/605

(58) Field of Classification Search .................. 62/602, 62/605, 604

See application file for complete search history.

(56) References Cited

U.S. PATENT DOCUMENTS

| | | | | | |
|---|---|---|---|---|---|
| 1,869,346 | A | * | 7/1932 | Comer | 62/604 |
| 1,974,478 | A | * | 9/1934 | Guglielmo | 62/604 |
| 3,576,112 | A | * | 4/1971 | Frost et al. | 62/605 |
| 3,618,330 | A | * | 11/1971 | Hardt | 62/605 |
| 3,670,516 | A | * | 6/1972 | Duron et al. | 62/605 |
| 4,776,769 | A | * | 10/1988 | Hilaris | 417/271 |
| 5,249,426 | A | * | 10/1993 | Spivak et al. | 62/605 |
| 5,385,023 | A | * | 1/1995 | Montemayor et al. | 62/605 |
| 5,475,981 | A | * | 12/1995 | Becker | 62/605 |
| 5,845,516 | A | * | 12/1998 | Allen, Jr. | 62/605 |

* cited by examiner

*Primary Examiner*—William C Doerrler
(74) *Attorney, Agent, or Firm*—Cesari and McKenna, LLP; John F. McKenna

(57) ABSTRACT

In an apparatus for making dry ice pellets having plural pressing chambers, each pressing chamber is provided with a movable piston for compressing carbon dioxide into solid state and for pressing the solid carbon dioxide through a perforated plate disposed at the end of the pressing chamber. Through connecting rods, the pistons in the pressing chambers are connected with a common crankshaft driven by a motor. The pressing chambers are provided with an inlet for supplying the carbon dioxide in fluid state and with outlet for carbon dioxide in gaseous state. In this way a very compact construction is achieved which is suited for mobile units, particularly dry ice blasting units.

14 Claims, 7 Drawing Sheets

PELLET PRESS FOR DRY ICE

Figure 1A:
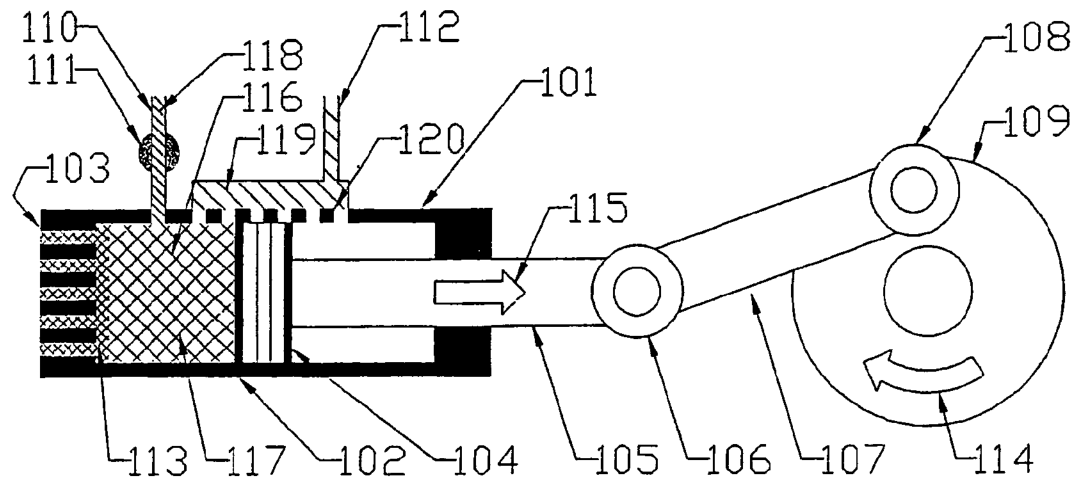

The present invention concerns an apparatus for making dry ice pellets as described in the preamble of claim 1. The invention furthermore concerns a device for dry ice blasting, a mobile unit and use of such an apparatus.

Ice of carbon dioxide, also called dry ice, is used in connection with cooling of foodstuffs as the ice, when thawing at room temperature, vaporises and does not leave any residues. Furthermore, the substance is not poisonous, which is an important feature.

Another application of dry ice is dry ice blasting for cleaning surfaces. Dry ice pellets are accelerated and directed against the surface of an object for removing the coating of the surface, e.g. remains of paint or dirt.

The making of dry ice pellets traditionally takes place with a dry ice press in which fluid carbon dioxide is introduced into a pressing chamber under expansion, whereby a part, typically a half, of the supplied carbon dioxide vaporises. The heat of vaporisation induces a drop in temperature whereby carbon dioxide ice in the form of snow is formed in the pressing chamber. This carbon dioxide snow is then subjected to pressure from a piston, whereby compressed snow or ice is formed, depending on the pressure. During compression of snow in the pressing chamber, the compressed carbon dioxide is pressed through a perforated plate whereby at the outer side there is discharged ice pellets. These dry ice pellets are collected in a container for further transport, e.g. for freezing foodstuffs or for dry ice blasting.

As a dry ice pellet press require the build-up of high pressure, it is common to construct the presses with large size as in the industry it is prejudicially assumed that large pressure and high production capacity also requires large apparatuses with much material in order to resist the pressure.

Examples of apparatuses for making dry ice pellets for blasting are disclosed in U.S. Pat. Nos. 5,473,903 and 5,845,516. The apparatuses described here are relatively large with a weight between 1200 and 1500 kg and in operation produces one portion of dry ice pellets about two times in a minute. By dry ice blasting, the dry ice pellets are used continually which means that the pellets from the apparatus are to be caught in a container wherefrom they are conveyed to the destination in smaller portions. The size of the apparatus implies that it is not suited for short breaks in the production. Furthermore, starting the production of dry ice pellets is a process that does not occur immediately but requires longer preparation time as the cooling time is long for such a large apparatus.

If the apparatus is used directly in connection with a dry ice blaster, these conditions necessitates a larger container as an interruption in the dry ice consumption, e.g. for a few minutes when the object to be blasted is turned or exchanged, will lead to accumulation of produced dry ice pellets.

A second solution to the problem is to collect the produced pellets in containers which are transported to the dry ice blaster on the site of blasting. This transport, however, causes a great loss of pellets by vaporisation from the only partly insulated containers. Thus new dry ice pellets have to be transported daily to the blaster which is a great disadvantage.

With a mobile dry ice press it would be possible to make dry ice pellets on the place of use, making the application of the pellet press much broader and easier. Thus there is a need in the industry for a mobile dry ice pellet press. The known apparatuses are, however, not suited for this purpose since they are too large. Making smaller and mobile apparatuses of the same construction as prior art stationary apparatuses is not advantageous either, as these mobile apparatuses will have too little production capacity, whereby the production of dry ice pellets on the site of application is no longer profitable.

The purpose of the invention is to provide an apparatus for making dry ice pellets which does not have the above drawbacks and which is particularly suited for compact units, preferably mobile units.

This purpose is achieved by an apparatus of the kind mentioned in the introduction, which is peculiar as indicated in the characterising part of claim 1.

By the invention there is provided an apparatus for dry ice production which is far lighter and more compact that prior art units, and which in spite of its small size has a relatively high production capacity.

By the inventive apparatus being provided with plural pressing chamber, even by far smaller pressing chambers there can be achieved a production of dry ice pellets in an amount comparable to the yield from far larger prior art units with one or two pressing chambers. Thereby is achieved an apparatus being far more compact and lighter that prior art units.

The apparatus may be designed so that the capacity of dry ice pellet production is less than prior art units. As the production capacity compared to the size of the apparatus is far greater than by the known principles, an apparatus according to the invention is suitable for mobile units.

The smaller pressing chambers in an apparatus according to the invention are to resist a pressure which is comparable to the pressure in larger pressing chambers in prior art units, but the sufficient wall thickness of the small chamber may be made less than the wall thickness in large chambers which saves material. As the piston area may also be less than the prior art apparatuses, the total force on the pistons is less, whereby less material is used for the pistons.

In principle, there is no limitation to the number of pressing chambers in an apparatus according to the invention. All the chambers are connected with a crankshaft through a connecting rod, the shaft being driven by a motor, e.g. a petrol or diesel engine, or an electric motor. Pistons in different chambers go through their reciprocating cycle displaced or staggered in time. For example, by an apparatus with six pistons there is achieved six production cycles of dry ice pellets in the course of one revolution of the crank shaft if the six pistons reach their dead point at different times. However, it is also possible that the six piston reach the same dead point in pairs so that we are speaking of three cycles per revolution of the crankshaft. Furthermore, it will be possible for a number of pistons in an apparatus according to the invention that two or more pistons are moving synchronously, i.e. taking up their dead point simultaneously.

It has appeared that an apparatus according to the invention may be made with pressing chambers having a cycle time of half a second. By six pressing chambers is thereby achieved a dry ice pellet production with a frequency of 12 Hz. As the production time for each pressing chamber during a cycle is approximately one sixth of this cycle, an almost continual pellet production is achieved without any interruption in the production as one pressing chamber begins to produce dry ice pellets before another chamber has finished its production.

This result is to be compared with the production frequency on one cycle per 20 seconds in prior art apparatuses.

The very much higher frequency of dry ice pellet production implies that there is no need for such a large collecting container before further transport of the pellets, e.g. to the site of dry ice blasting. This is a further advantage, particularly if the apparatus according to the invention is to be used in mobile units.

If the dry ice pellets are transported continuously to the site of dry ice blasting, there may be achieved an almost continuous feeding of pellets to the dry ice blaster due to the relatively high rate of production, which is a further advantage desirable in a mobile unit.

As the apparatus according to the invention is smaller and more compact that prior art units, it is possible to interrupt and start the production of dry ice pellets very quickly, why there is no need for a large storage container for the pellets if the consumption of pellets stops for a short while, cf. the discussion in the introduction of the present description.

It is advantageous to enclose the outer wall of a pressing chamber, or at least a part of the outer wall, with fluid carbon dioxide, as also the inner wall of the pressing chamber is thereby heated up in relation to the temperature of the carbon dioxide snow inside side the pressing chamber. In this way, no carbon dioxide ice is formed on the inner wall of the pressing chamber, and the friction between the piston and the inner wall is reduced. This further development of the invention may also be used with advantage in apparatuses according to prior art but is particularly useful in connection with an apparatus according to the invention. As the friction between piston and inner wall of the pressing chamber is far less than in apparatuses according to prior art, the piston, the connecting rods and the crankshaft be dimensioned in a way which is far less material demanding than immediately expected with background in prior art. This material saving measure is particularly useful in application of an apparatus according to the invention in connection with a mobile unit.

By enclosing the pressing chambers in an apparatus according to the invention with fluid carbon dioxide, further advantages are achieved. Firstly, this causes the press to stay cooled at breaks in the production of the dry ice pellets. Secondly, it implies a possibility of a simplifying the press as explained in the following. If the surrounding reservoir of fluid carbon dioxide is dimensioned to contain an amount of carbon dioxide which is relatively large compared with the amount currently used, the reservoir acts as buffer for the carbon dioxide consumption in the dry ice pellet production. Thus, if a small part of the enclosing fluid carbon dioxide is drawn off for dry ice production, the pressure and temperature in this buffer will not change substantially. This implies that pressure and temperature in the valve at the inlet for the pressing chamber is not changed substantially either, and therefore the valve does not freeze. As a result, there may be used very simple and light valves which previously could not be used. This is not only much more simple and cheap to make and service but also lead to an additional material saving which is a great advantage if the apparatus according to the invention is used in connection with a mobile unit.

During the production of dry ice, the carbon dioxide ice is pressed through a perforated plate at the end of the pressing chamber. In order to achieve dry ice pellets of a definite length, a cutting unit may be placed at each perforated plate, e.g. a propeller cutter as described in the above U.S. Pat. No. 5,473,903.

Typical dry ice pellets are 1 to 4 mm in diameter and 1 to 10 mm in length. The invention, however, is not limited to these pellet sizes.

Another cutting unit may be formed as a screw running across of the perforated plates. In this case, the perforated plates are designed with a concave outer side at which the screw is disposed. Thus the same screw may be used for all the pressing chambers in the apparatus, contributing to making the apparatus according to the invention in very compact form, which generally is an advantage but particularly if the apparatus is used in conjunction with a mobile unit. If advantageous, it is within the frame of the invention to use several screws for transporting the dry ice pellets.

Alternatively, instead of a screw with helical cutting blade, a cutter unit with one or more cutter blade disposed in parallel with the axis of rotation can be used.

In the prior art apparatuses for dry ice production, the produced carbon dioxide gas is discharged from the system. This is waste of resources but has been chosen as the attention previously has not been on volume saving measures. For compact units, particularly mobile units, it is, however, an advantage to reuse the carbon dioxide gas as a smaller accompanying carbon dioxide container may then be satisfactory. By catching the vaporised carbon dioxide and reusing it, the consumption of fluid carbon dioxide may be reduced with 50%. The recovery facility thus implies a considerable economic advantage.

Figure 1B:
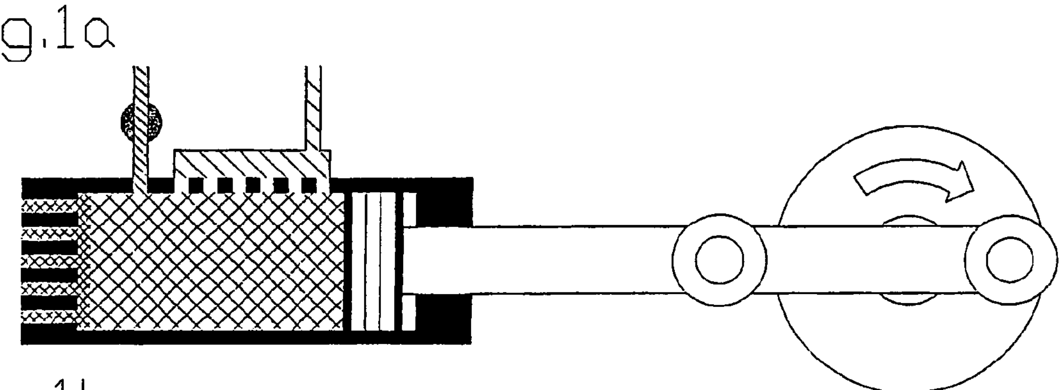
Figure 1C:
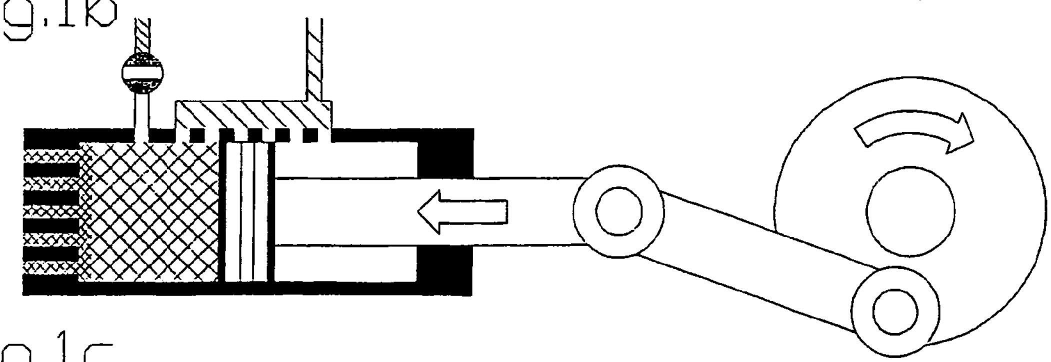
Figure 1D:
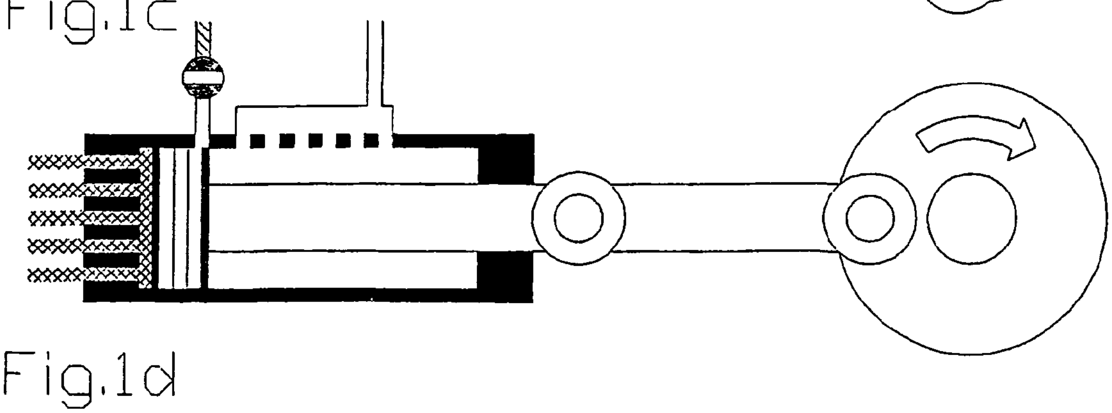
Figure 2A:
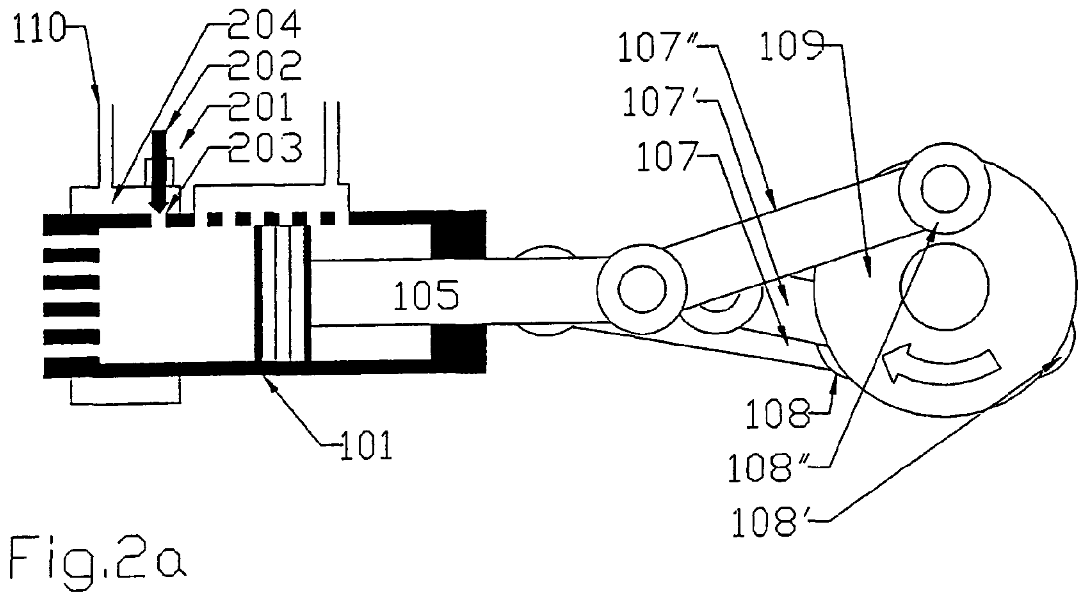
Figure 2B:
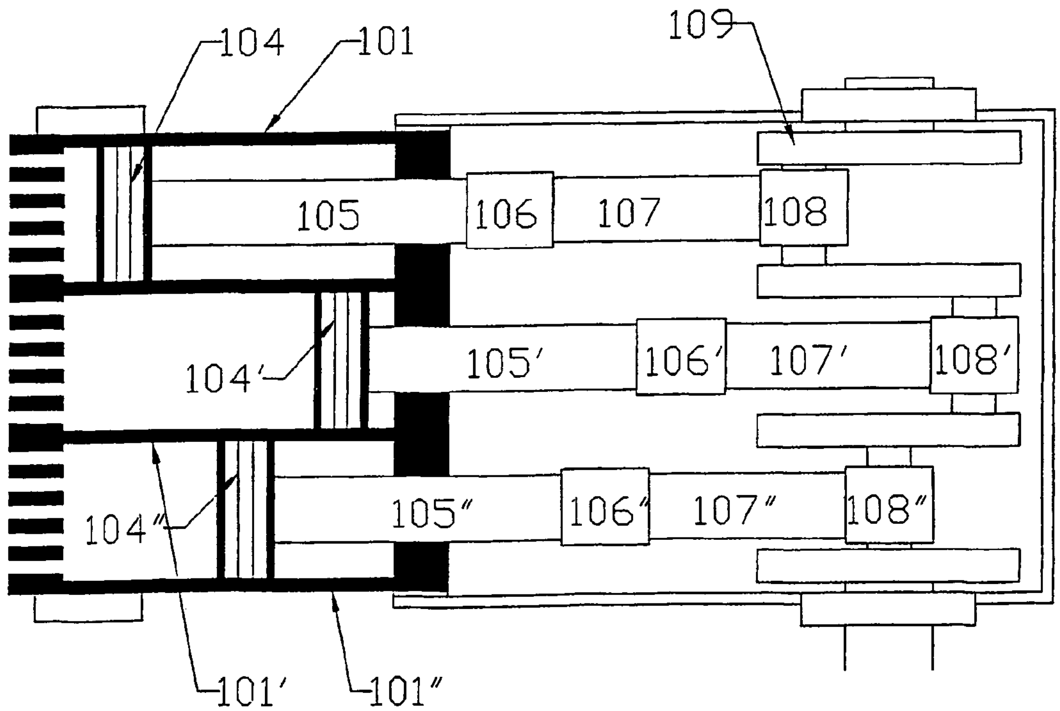
Figure 3A:
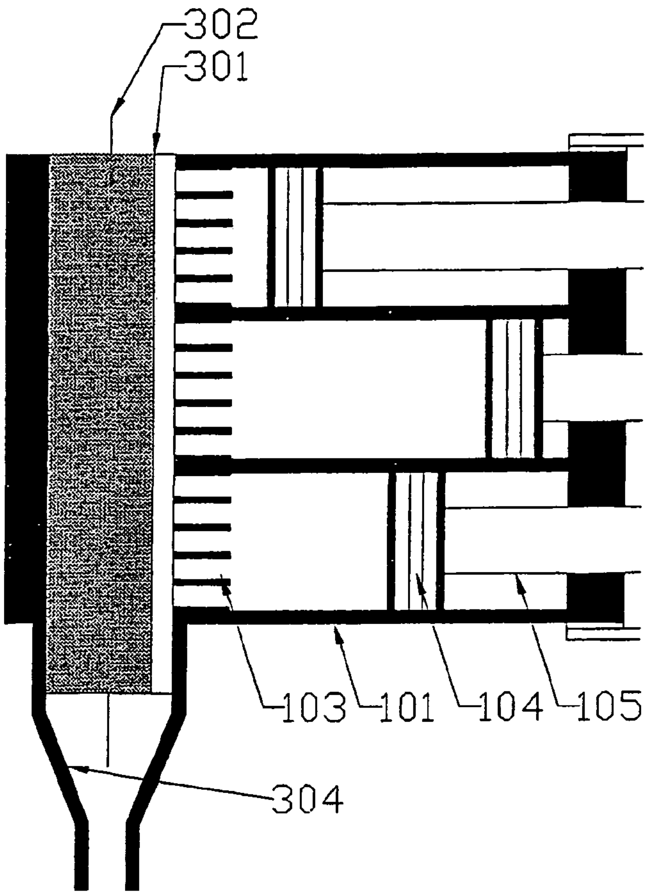
Figure 3C:
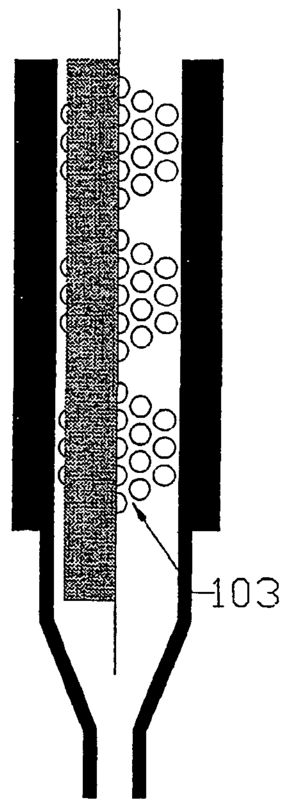
Figure 3B:
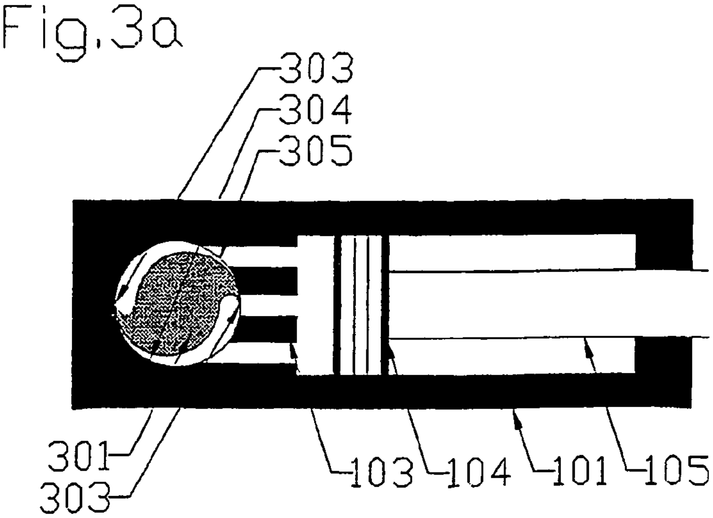
Figure 4:
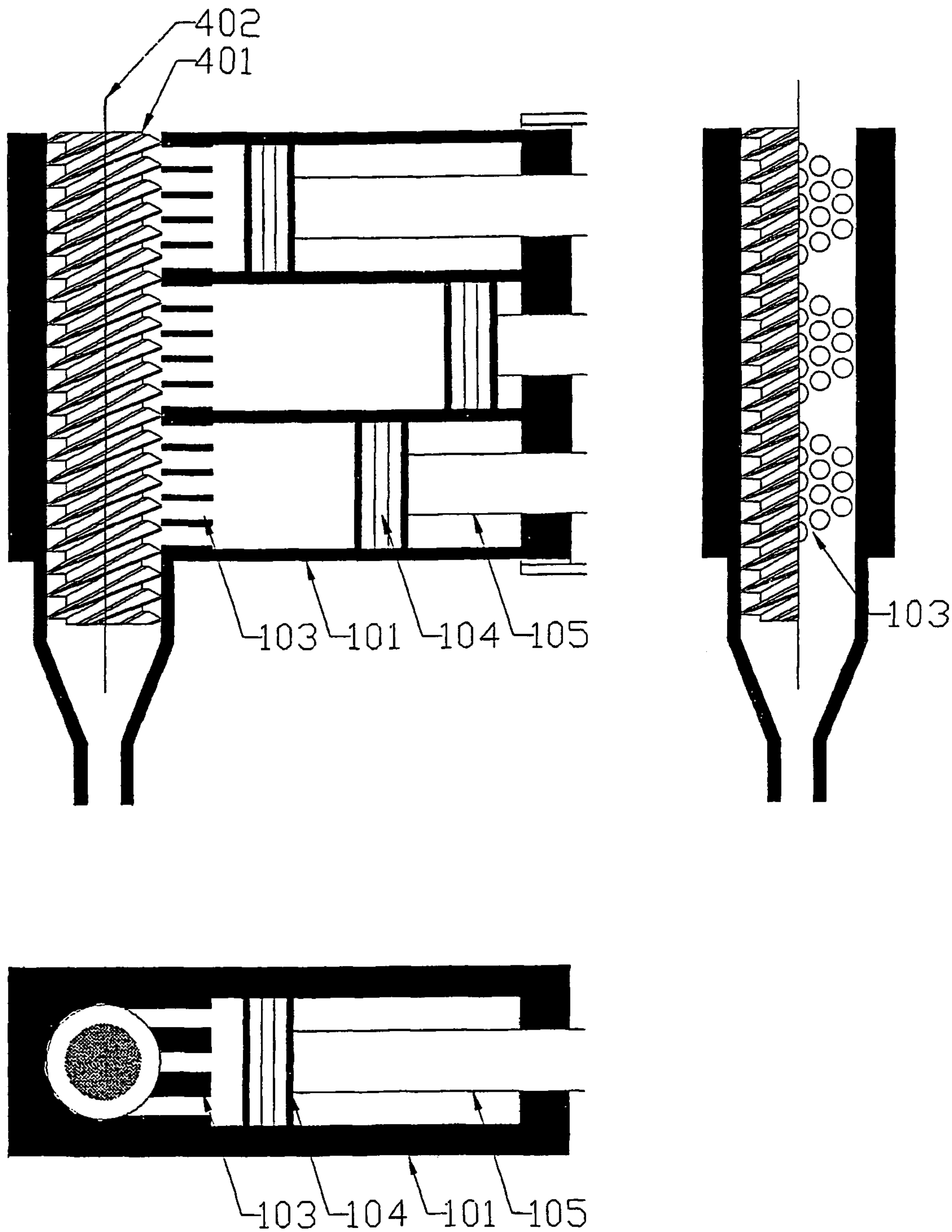
Figure 5:
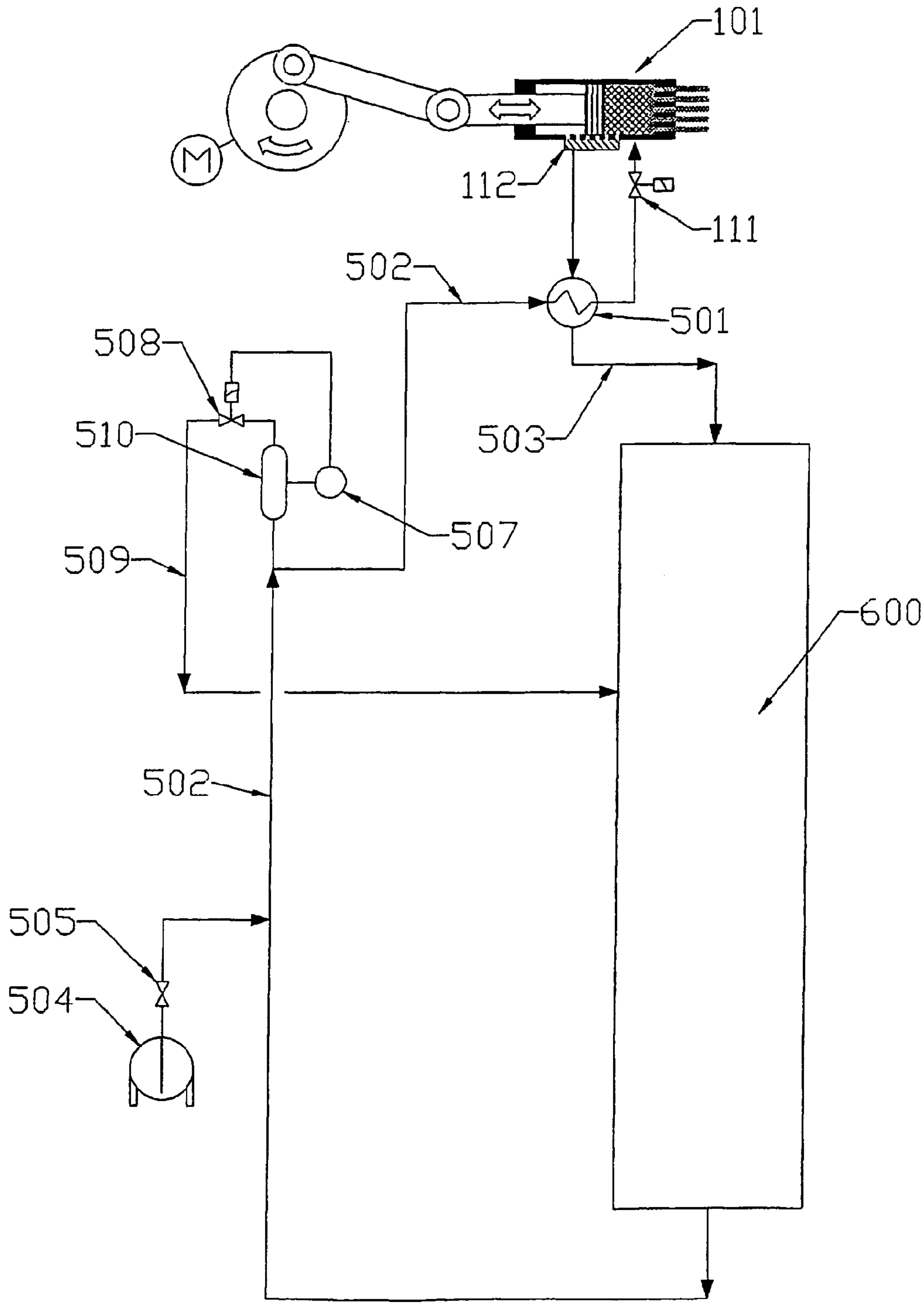
Figure 6:
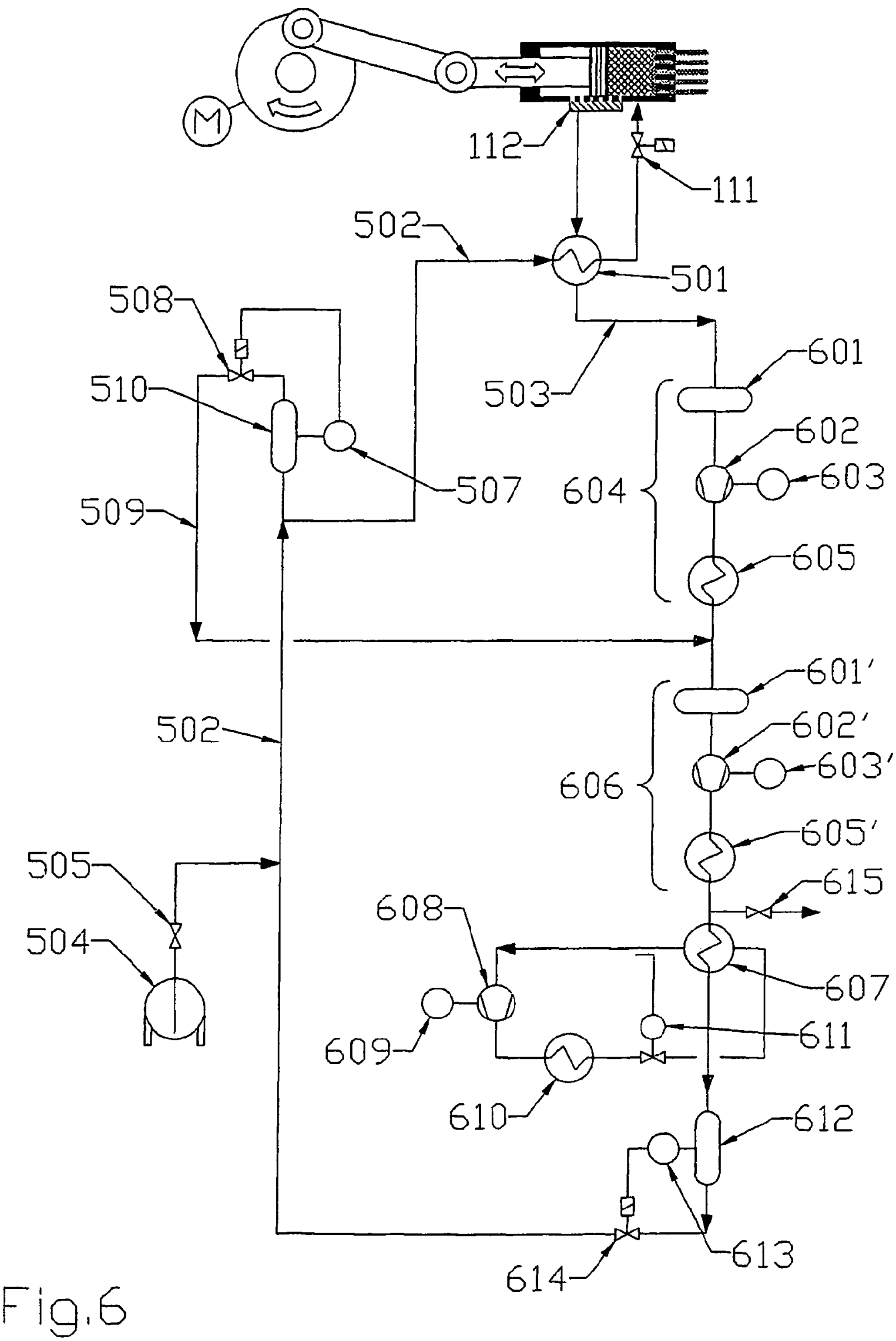
Figure 7:
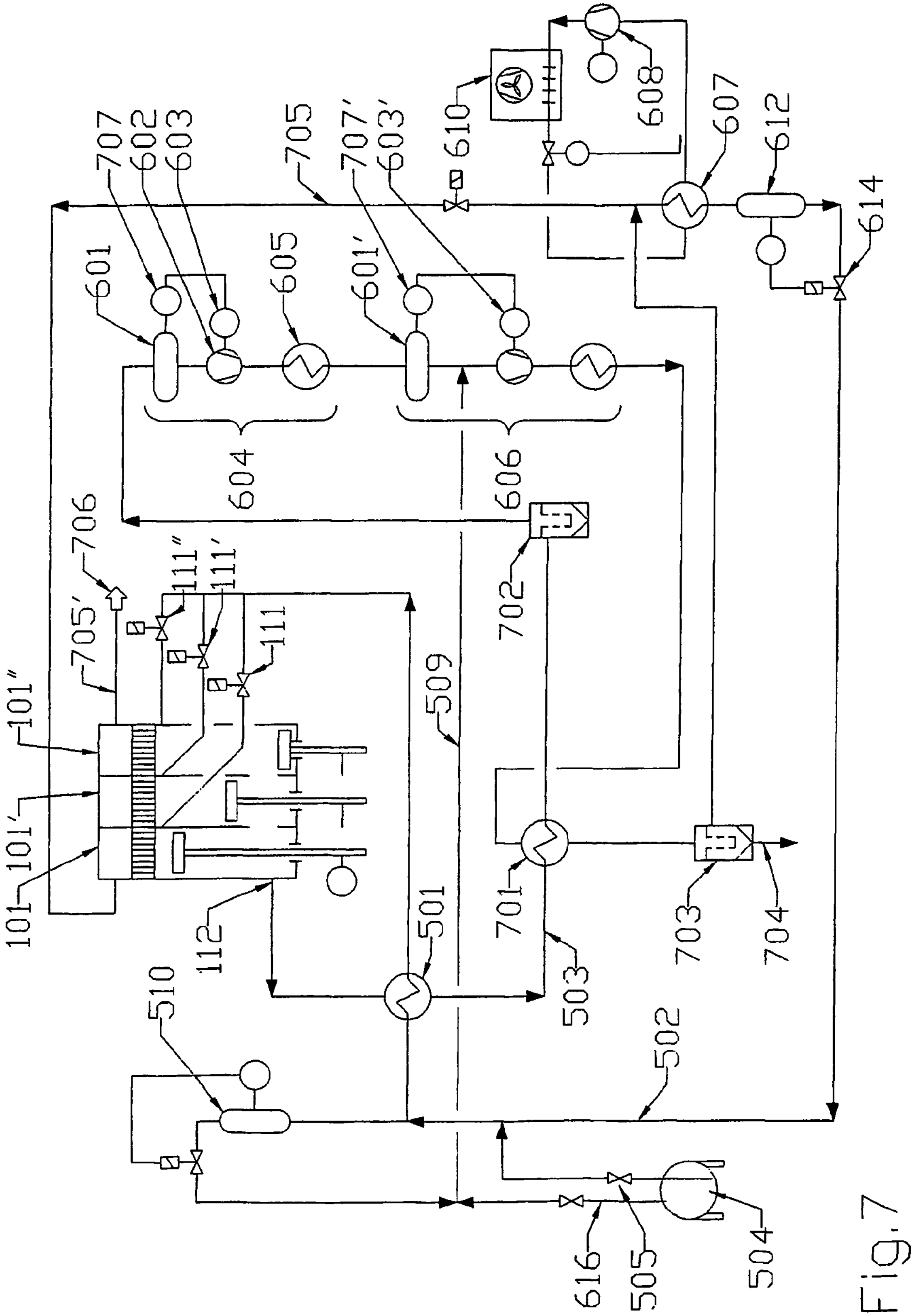

The invention is now explained in the following with reference to the drawing, where:

FIGS. 1*a–d* illustrates four stages, respectively, of the function of a pressing chamber, FIGS. 2*a–b* shows schematically three pressing chambers in a compound construction in a side view and a top view, respectively, FIGS. 3*a–c* shows three mutually perpendicular views, respectively, of a cutter unit with cutter blades extending in parallel with the axis of rotation, FIG. 4 shows three views of a cutter unit of the screw type, FIG. 5 is a diagram of the connection between the pressing chamber and a carbon dioxide recovery facility, FIG. 6 is a diagram of the recovery facility in a first embodiment, and FIG. 7 is a diagram of the recovery facility in a second embodiment.

FIG. 1*a* shows a pressing chamber 101 with side wall 102 and perforated plate 103. A piston 104, linearly movable in the pressing chamber 101, is reciprocated in the chamber by means of a connecting rod 105 which through a link 106 is connected with a connecting rod 107. The connecting rod 107 is in engagement with a rotating bearing 108 on the crankshaft 109. The pressing chamber 101 is furthermore provided with an inlet 110 and an inlet valve 111 for fluid carbon dioxide and a outlet 112 for carbon dioxide in gaseous state.

FIGS. 1*a–d* illustrate the function of the pressing chamber 101. In FIG. 1*a*, the perforated plate 103 is closed with dry ice 113 from the last production cycle. Due to the rotation of the crankshaft 109 in the direction indicated with arrow 114, the piston 104 is moved in direction away from the perforated plate 103 as indicated with a second arrow 115. During this movement, liquid carbon dioxide 118 is supplied from the opened inlet valve 111 through the inlet 110 into the interior 116 of the pressing chamber 101, whereby carbon dioxide snow 117 and carbon dioxide gas 119 are formed due to pressure differences between the inlet 110 and the interior 116 of the pressing chamber. The gas 119 leaves the interior 116 via the outlet 112. A filter screen 120 at the outlet 112 retains the carbon dioxide snow 117 in the interior of the chamber 116.

On FIG. 1*b* the piston 104 has reached it first dead point, and the interior 116 of the chamber is filled with carbon dioxide snow. The valve 11 is subsequently closed as shown on FIG. 1*c*. During the continued rotation of the crankshaft 109, the snow 117 is compressed to a solid mass and is pressed through the apertures in the perforated plate 103 as shown on FIG. 1*d*, where the piston 104 has reached its second dead point and commences the return stroke.

On FIGS. 2*a* and 2*b* is seen the pressing chamber 101 in to different views together with the connecting rods 105 and 107 together with connecting rods 107',107" and bearings 108',108" for the two other pressing chambers 101',101". The three pistons 104,104',104" shown have different mutual positions, and their cycles are mutually displaced with one third revolution of the crankshaft 109. For each revolution of the crankshaft 109, three portions of dry ice pellets will thus be produced.

In order to achieve continual production of pellets, the number of pressing chambers has to be adapted to the production time of each pressing chamber within a cycle. If the production time is one sixth, or one eighth, respectively, of a cycle, there is need for six or eight, respectively, pressing chambers working angularly displaced with one sixth or one eighth, respectively, of a revolution of the crankshaft.

The dry ice 113 leaves the perforated plate 103 as rods, where each rod has cross-section equal to the hole through which the rod is pressed through. In order to form dry ice pellets, a cutting unit cuts these rods into suitable lengths.

The apparatus according to the invention may provide different pellet sizes and with different piston pressure. For example, the inner diameter of the pressing chambers is between 10 and 80 mm, preferably between 15 and 30 mm, and most preferred between 18 and 25 mm. The stroke of the piston may e.g. be between 20 and 300 mm, preferably between 30 and 150 mm, and most preferred between 50 and 100 mm. The pressure of the piston on the solid carbon dioxide is e.g. between 20 and 1000 bar, preferably between 80 and 500 bar, and most preferred between 200 and 400 bar. The cycle time of a cycle of a pressing chamber with reciprocating piston is e.g. between 0.05 and 30 seconds, preferably between 0.2 and 5 seconds, and most preferred between 0.5 and 2 seconds.

On FIG. 2*a* is shown a second embodiment of an inlet valve 201. This inlet valve 201 is designed as a shutter 202 in a valve seat 203 which is mechanically connected with the wall of the pressing chamber, where the shutter 202 is surrounded by fluid carbon dioxide in a reservoir 204 at least partly surrounding the pressing chambers. The surrounding reservoir 204 of fluid carbon dioxide contains an amount of carbon dioxide which is relatively great compared with the amount currently used, whereby the pressure and temperature in this buffer will not change substantially. This implies that the pressure and the temperature in the valve 201 at the inlet 110 to the pressing chamber 101 is not changed substantially, and that the valve therefore does not freeze even if the valve is of a very simple construction.

On FIGS. 3*a*–3*c*, a cutter unit 301 is shown i three different views, where FIG. 3*a* shows the cutting unit as seen in direction perpendicular to the pressing chambers 101, 101',101" and perpendicular to the axis of rotation 302 of the cutting unit 301. FIG. 3*b* shows the cutting unit 301 as seen in direction perpendicular to the pressing chambers and in parallel with the axis of rotation 302 of the cutting unit FIG. 3*c* shows the cutting unit 301 as seen in direction perpendicular to the outer side of the perforated plate, where, however, only half of the cutting unit is shown.

The cutting unit 301 rotates about an axis 302 in a cylindrical housing 304 and has cutter blades 303 extending in parallel with the axis of rotation 302. The perforated plates are formed with a concave outer side 305 forming wall in the cylindric housing 304 in which the cutter unit 301 is running. The length of the cut dry ice pellets in front of the perforated plate 103 depend on the rotational speed of the cutting unit.

The cut pellets may e.g. be conveyed from the perforated plate 103 to a collecting container or to the place of use by means of carrier gas which is blown past the outer side of the perforated plate 103. This carrier gas may be carbon dioxide from the outlet 112 but it is preferred to use other gas with higher pressure from recovery facilities as described below.

It is also possible to design the cutter unit as a screw 401 as illustrated on FIG. 4 in several views corresponding to FIGS. 3*a*–3*c*, respectively. Rotation of the screw 401 leads to cutting of the dry ice pellets and conveying along the axis of rotation 402 of the screw.

FIG. 5 shows in principle the connection between the pressing chamber with a carbon dioxide recovery facility 600. Gas leaving the pressing chamber 101 via the outlet 112 has a temperature lower than the supplied fluid carbon dioxide. Therefore, it is known to use a heat exchanger 501 in which the heat from the fluid carbon dioxide in the inlet pipe 502 is transferred to the carbon dioxide gas in the outlet pipe 503 to achieve cooling of the fluid carbon dioxide for increasing the effectiveness of the dry ice press.

The fluid carbon dioxide is primarily supplied from a carbon dioxide tank 504 provided with a shutoff valve 505. Carbon dioxide gas from vaporisation of fluid carbon dioxide in the supply pipes 502 is received in a first container 510. The container 510 contains liquid carbon dioxide as well as gas. When the liquid level in the container 510 drops, this is registered by a level sensor 507 causing a valve 508 to open for conduction of gas through a recovery pipe 509 to a recovery plant 600. The gas collected from the outlet 112 is also supplied to the recovery facility 600 through the outlet pipe 503. In the recovery facility 600, the gas is condensed to liquid carbon dioxide which then enters the circuit via the supply pipe 502.

FIG. 6 shows the recovery facility 600 in greater detail in a first embodiment. The gas from the outlet 112 is supplied to a first compression stage 604 of which a gas container 601 forms a part, causing levelling of fluctuations in the gas flow before a compressor 602. Contrary to prior art, where a large balloon is utilised for this levelling, an apparatus according to the invention may operate at a higher pressure in the outlet pipe 503 and a more even gas flow due to the higher frequency of the cycles. Not only a volume reduction is thereby attained in an apparatus according to the invention but it also provides possibility for using a compressor with relatively low yield and power consumption.

The compressor 602 is driven by a motor 603 and compresses the gas whereby this achieves higher temperature and pressure. In a subsequent heat exchanger 605 heat is extracted from the gas. At the first compression stage 604, gas is supplied from the first container 510 through the recovery pipe 509.

Then the carbon dioxide is subjected to a second compression stage 606 which corresponds to the first compression stage 604 and also comprising a gas container 601', a compressor 602' driven by a motor 603', and a heat exchanger 605'.

In order to avoid accumulation of other kinds of gases which do not condense at the given pressures and temperatures, there is provided a discharge valve 615 for discharging gas.

Then the carbon dioxide gas is condensed to liquid state by further cooling in a heat exchanger 607 forming part of a cooling circuit with coolant, e.g. freon, compressor 608 driven by a motor 609, and a heat exchanger 610. In the circuit there is also an expansion valve 611 for the coolant.

An arrangement with a container 612, a level sensor 613 and an automatic valve 614 ensures that only liquid carbon dioxide is conducted to the supply pipe 502. Gas from the container 612 is condensed in heat exchanger 607.

FIG. 7 shows the recovery facility 600 in greater detail in a second embodiment. The three pressing chambers 101, 101', 101" are fed with fluid carbon dioxide through the inlet valves 111,111',111". The gas from the outlet 112 goes through a heat exchanger 501 for cooling the supplied fluid carbon dioxide from the supply pipe 502. The carbon dioxide is drawn from a tank 504 through a shutoff valve 505 as in the illustration on FIG. 5. Possible gas from the tank 504 and gas from the first container enter the recovery facility through pipe 616 and recovery pipe 509.

In prior art systems gas is discharged from the tank 504 in order to keep down the pressure in the tank 504 at a secure level. By collecting and reusing the gas from the tank 504, waste of carbon dioxide is reduced. Furthermore, this has the advantage that high standards for insulation of the tank 504 are not required, and an additional cooling unit for the tank 504 may be dispensed with as the recovery facility 600 may be used for condensing this from the gas vaporised from the tank 504, after which liquid carbon dioxide is returned to the tank 504.

The gas from the outlet 112 on FIG. 7 is provided with two compressing stages 604 and 606 where the gas from the recovery pipe 509 enters after container 601'. Compressor 602,602' is driven by motor 603,603' which is controlled via pressure sensors 707,707'.

It is preferred, but not necessary, to cool the carbon dioxide after the second compressing stage 606 through a further heat exchanger 701 where heat is given off to the gas from the outlet pipe 503. This reduces the need for cooling in the subsequent heat exchanger 607 and is a great advantage enabled by the building together of the dry ice pellet press with the recovery facility 600.

Optionally, though not necessarily, the carbon dioxide runs through a particle filter 702 for safeguarding the succeeding compressors.

By an apparatus according to the invention utilised in a smaller scale, preferably as mobile unit, a recovery facility will need a capacity which is less than that being necessary in connection with many large existing units. The components in the recovery facility may therefore be selected among components which are used in other commercial and widely used cooling units. In this way it is possible to build up a carbon dioxide recovery facility in connection with an apparatus for making dry ice pellets for a far lower price than hitherto possible. For example, the widely used and cheap oil lubricated compressors may thus be utilised. In this case an oil separation filter 703 forms a part of the recovery facility 600. Possible contamination, such as oil collected in this filter, may be taken out via the outlet 704 and possibly reused.

Then the carbon dioxide runs through a third cooling compressing stage in which there is a cooling circuit with coolant, e.g. freon, compressor 608 driven by a motor 609, and a coolant condenser 610.

A part of the remaining gas after this stage is drawn off via an additional discharge pipe 705 for counteracting accumulation of other gasses as the carbon dioxide from the tank 504 possibly contains small amounts of other materials. The gas from discharge pipe 705 may be used for transporting the dry ice pellets through pipe 705' to the destination 706. In principle, it is also possible to use gas from the outlet 112 for transporting the pellets if this gas is supplied to the discharge side of the perforated plates 103 by means of a pipe system. However, due to the higher pressure the discharge gas is preferred for transporting the dry ice pellets.

If the unit is used for dry ice blasting, the hot air produced in heat exchanger 605,605' and possibly 610 may advantageously be led to the destination 706 for heating the surface of the object to be treated, or which has be treated with dry ice blasting. Materials to be removed from a surface by dry ice blasting may often be heated with hot air with advantage before the treatment. Furthermore, it is advantageous to heat surfaces after treatment with dry ice blasting for preventing formation of condensed water on the surface.

An apparatus according to the invention, including a recovery facility, has a volume which in principle is not limited to some fixed values and may be provided e.g. with a volume between 0.5 and 6 $m^3$, preferably between 1 and 4 $m^3$, and most preferred between 1 and 2 $m^3$. The weight is e.g. between 100 and 2000 kg, preferably between 150 and 1200 kg, and most preferred between 200 and 750 kg.

In the above a number of different parameters have been described to be provided for optimally achieving a compact, preferably mobile, unit with an apparatus for making dry ice pellets. However, it is possible to use each parameter separately in order to improve existing technology.

In the above, the invention has been illustrated with plural pressing chambers disposed in parallel. However, it is within the scope of the invention to configure the pressing chambers in other ways as also known from car or airplane engines, e.g. in V-form or radially.

What is claimed is:

1. An apparatus for making dry ice pellets, comprising at least one pressing chamber with a movable piston for compressing carbon dioxide into a solid state and for pressing the solid carbon dioxide through a perforated plate disposed at the end of the pressing chamber, where the pressing chamber is provided with an inlet for supplying the carbon dioxide in the fluid state and with an outlet for exhausting carbon dioxide in the gaseous state, characterised in that the inlet includes a valve and at least a part of the outer wall of the pressing chamber and the valve are enclosed by fluid carbon dioxide.

2. An apparatus according to claim 1, characterised in that the inlet communicates with the enclosing fluid carbon dioxide via the valve.

3. An apparatus according to claim 1, characterised in that the valve is of the type including a valve seat which is provided with a mechanical connection to the wall of the pressing chamber.

4. An apparatus according to claim 1, characterised in that the apparatus is provided with at least one cutting unit for cutting off pellets of dry ice at an outer side of the perforated plates.

5. An apparatus for making dry ice pellets, comprising at least one pressing chamber with a moveable piston for compressing carbon dioxide into a solid state and for pressing the solid carbon dioxide through a perforated plate disposed at the end of the pressing chamber, where the pressing chamber is provided with an inlet for supplying the carbon dioxide in the fluid state and with an outlet for exhausting carbon dioxide in the gaseous state, characterised in that the apparatus is provided with plural pressing chambers each including a piston, perforated plates are disposed at the ends of the pressing chambers, the pistons in the pressing chambers are connected with a common crankshaft driven by a motor through connecting rods, the pistons in different pressing chambers have mutually chronologically displaced cycles so that dry ice pellets leave the pressing chambers at different times, the perforated plates have a circular concave outer side with a central axis, and the apparatus is provided with at least one cutting unit for cutting off pellets of dry ice at said outer side, said cutting unit extending transversely of and partly in the outer side and having at least one cutting blade extending largely parallel to said axis.

6. An apparatus according to claim 1, characterised in that the apparatus is connected to a carbon dioxide recovery facility for receiving the carbon dioxide gas from the outlet, for transforming this gas to liquid carbon dioxide and for reusing the liquid carbon dioxide for making dry ice.

7. An apparatus according to claim 6, characterised in that that the recovery facility is provided with a discharge valve for discharging pressurised gas, that the apparatus furthermore is provided with a valve system and duct system for conducting the discharged gas to the perforated plates as carrier gas for transporting the dry ice pellets from the perforated plates to the destination.

8. An apparatus according to claim 6, characterised in that the apparatus is provided with a heat exchanger for transferring heat from the gas compressed in at least one compression stage of the recovery facility to the carbon dioxide gas from the outlet.

9. An apparatus according to claim 6, characterised in that the apparatus is provided with a carbon dioxide storage tank, that the recovery facility is provided with a duct system and valve system for collecting vaporised carbon dioxide from the tank and for conducting fluid carbon dioxide back to the tank.

10. An apparatus for making dry ice pellets, comprising at least one pressing chamber with a moveable piston for compressing carbon dioxide into a solid state and for pressing the solid carbon dioxide through a perforated plate disposed at the end of the pressing chamber, where the pressing chamber is provided with an inlet for supplying the carbon dioxide in the fluid state and with an outlet for exhausting carbon dioxide in the gaseous state, characterised in that the apparatus is provided with plural pressing chambers each including a piston, perforated plates are disposed at the ends of the pressing chambers, the pistons in the pressing chambers are connected with a common crankshaft driven by a motor through connecting rods, the pistons in different pressing chambers have mutually chronologically displaced cycles so that dry ice pellets leave the pressing chambers at different times, the apparatus is connected to a carbon dioxide recovery facility for receiving the carbon dioxide gas from the outlet, for transforming this gas to liquid carbon dioxide and for reusing the liquid carbon dioxide for making dry ice, and the recovery facility includes at least one compressor and/or heat exchanger producing hot air and an air duct system for transporting the hot air to an object to be heated.

11. A mobile unit comprising an apparatus according to claim 1.

12. Use of an apparatus according to claim 1 in connection with dry ice blasting.

13. An apparatus for making dry ice pellets, comprising at least one pressing chamber with a movable piston for compressing carbon dioxide into a solid state and for pressing the solid carbon dioxide through a perforated plate disposed at the end of the pressing chamber, where the pressing chamber is provided with an inlet for supplying the carbon dioxide in the fluid state and with an outlet for exhausting carbon dioxide in the gaseous state, characterized in that at least part of the outer wall of the pressing chamber is enclosed by fluid carbon dioxide, the perforated plate has a circular concave outer side with a central axis, and the apparatus is provided with at least one cutting unit for cutting off pellets of dry ice at said outer side, said cutting unit extending transversely of and partly in the outer side and having at least one cutting blade extending largely parallel to said axis.

14. An apparatus for making dry ice pellets, comprising at least one pressing chamber with a movable piston for compressing carbon dioxide into a solid state and for pressing the solid carbon dioxide through a perforated plate disposed at the end of the pressing chamber, where the pressing chamber is provided with an inlet for supplying the carbon dioxide in the fluid state and with an outlet for exhausting carbon dioxide in the gaseous state, characterized in that at least part of the outer wall of the pressing chamber is enclosed by fluid carbon dioxide, the apparatus is connected to a carbon dioxide recovery facility for receiving the carbon dioxide gas from the outlet, for transforming this gas to liquid carbon dioxide and for reusing the liquid carbon dioxide for making dry ice, and said recovery system includes at least one compressor and/or heat exchange producing hot air and an air duct system for transporting the hot air to an object to be heated.

* * * * *